(12) United States Patent
Diehl et al.

(10) Patent No.: US 10,693,360 B2
(45) Date of Patent: Jun. 23, 2020

(54) TRANSMISSIONS INCORPORATING EDDY CURRENT BRAKING

(71) Applicant: Eddy Current Limited Partnership, Wellington (NZ)

(72) Inventors: Andrew Karl Diehl, Wellington (NZ); Weston Hill, Wellington (NZ); Dave Walters, Wellington (NZ)

(73) Assignee: EDDY CURRENT LIMITED PARTNERSHIP, Wellington (NZ)

( * ) Notice: Subject to any disclaimer, the term of this patent is extended or adjusted under 35 U.S.C. 154(b) by 172 days.

(21) Appl. No.: 15/532,973

(22) PCT Filed: Dec. 4, 2015

(86) PCT No.: PCT/NZ2015/050207
§ 371 (c)(1),
(2) Date: Jun. 2, 2017

(87) PCT Pub. No.: WO2016/089227
PCT Pub. Date: Jun. 9, 2016

(65) Prior Publication Data
US 2018/0269768 A1 Sep. 20, 2018

(30) Foreign Application Priority Data

Dec. 4, 2014 (NZ) .................................. 701549

(51) Int. Cl.
*H02K 49/04* (2006.01)
*H02K 7/116* (2006.01)
(Continued)

(52) U.S. Cl.
CPC ............ *H02K 49/046* (2013.01); *A62B 1/08* (2013.01); *A63B 69/0048* (2013.01); *H02K 7/116* (2013.01); *H02K 49/04* (2013.01)

(58) Field of Classification Search
CPC ...... H02K 49/046; H02K 49/04; H02K 7/116; H02K 41/035; A62B 1/08; A63B 69/0048; G11B 5/55
See application file for complete search history.

(56) References Cited

U.S. PATENT DOCUMENTS 2,058,024 A 10/1936 Logan, Jr.
2,122,312 A 6/1938 Cassion
(Continued)

FOREIGN PATENT DOCUMENTS

CN 1783674 A 6/2006
CN 101820952 A 9/2010
(Continued)

OTHER PUBLICATIONS

Extended European Search Report, dated Jul. 11, 2017, for European Application No. 14872681.3-1809, 10 pages.
(Continued)

*Primary Examiner* — Katherine W Mitchell
*Assistant Examiner* — Candace L Bradford
(74) *Attorney, Agent, or Firm* — Seed Intellectual Property Law Group LLP

(57) ABSTRACT

Described herein is a transmission mechanism and an associated method of use for braking relative movement between members, movement and braking of the members being directed through one or more transmission elements.

27 Claims, 4 Drawing Sheets

(51) Int. Cl.
  *A62B 1/08* (2006.01)
  *A63B 69/00* (2006.01)

(56) References Cited

U.S. PATENT DOCUMENTS

| | | |
|---|---|---|
| 2,122,315 A | 6/1938 | Fosty et al. |
| 2,272,509 A * | 2/1942 | Cavallo .................. F16H 15/40 |
| | | 476/37 |
| 2,409,009 A | 10/1946 | Bakke |
| 2,428,104 A | 9/1947 | Winther |
| 2,437,871 A | 3/1948 | Wood |
| 2,492,776 A | 12/1949 | Winther |
| 2,771,171 A | 11/1956 | Schultz |
| 2,807,734 A | 9/1957 | Lehde |
| 3,364,795 A | 1/1968 | De Coye De Castelet |
| 3,447,006 A | 5/1969 | Bair |
| 3,721,394 A | 3/1973 | Reiser |
| 3,868,005 A | 2/1975 | McMillan |
| 3,934,446 A | 1/1976 | Avitzur |
| 3,962,595 A | 6/1976 | Eddens |
| 3,967,794 A | 7/1976 | Fohl |
| 4,078,719 A | 3/1978 | Durland et al. |
| 4,093,186 A | 6/1978 | Golden |
| 4,224,545 A | 9/1980 | Powell |
| 4,271,944 A | 6/1981 | Hanson |
| 4,306,688 A | 12/1981 | Hechler, IV |
| 4,416,430 A | 11/1983 | Totten |
| 4,434,971 A | 3/1984 | Cordrey |
| 4,544,111 A | 10/1985 | Nakajima |
| 4,561,605 A | 12/1985 | Nakajima |
| 4,567,963 A | 2/1986 | Sugimoto |
| 4,612,469 A | 9/1986 | Muramatsu |
| 4,676,452 A | 6/1987 | Nakajima |
| 4,690,066 A | 9/1987 | Morishita et al. |
| 4,846,313 A | 7/1989 | Sharp |
| 4,938,435 A | 7/1990 | Varner et al. |
| 4,957,644 A | 9/1990 | Price et al. |
| 4,974,706 A | 12/1990 | Maji et al. |
| 5,054,587 A | 10/1991 | Matsui et al. |
| 5,064,029 A | 11/1991 | Araki et al. |
| 5,084,640 A * | 1/1992 | Morris ............... H02K 41/0356 |
| | | 310/13 |
| 5,205,386 A | 4/1993 | Goodman et al. |
| 5,248,133 A | 9/1993 | Okamoto et al. |
| 5,272,938 A | 12/1993 | Hsu et al. |
| 5,342,000 A | 8/1994 | Berges et al. |
| 5,392,881 A | 2/1995 | Cho et al. |
| 5,441,137 A | 8/1995 | Organek et al. |
| 5,465,815 A | 11/1995 | Ikegami |
| 5,477,093 A * | 12/1995 | Lamb .................. H02K 49/046 |
| | | 310/75 D |
| 5,483,849 A | 1/1996 | Orii et al. |
| 5,495,131 A | 2/1996 | Goldie et al. |
| 5,636,804 A | 6/1997 | Jeung |
| 5,692,693 A | 12/1997 | Yamaguchi |
| 5,711,404 A | 1/1998 | Lee |
| 5,712,520 A | 1/1998 | Lamb |
| 5,722,612 A | 3/1998 | Feathers |
| 5,742,986 A | 4/1998 | Corrion et al. |
| 5,779,178 A | 7/1998 | McCarty |
| 5,791,584 A | 8/1998 | Kuroiwa |
| 5,822,874 A | 10/1998 | Nemes |
| 5,862,891 A | 1/1999 | Kröger et al. |
| 5,928,300 A | 7/1999 | Rogers et al. |
| 6,041,897 A | 3/2000 | Saumweber et al. |
| 6,042,517 A | 3/2000 | Gunther et al. |
| 6,051,897 A | 4/2000 | Wissler et al. |
| 6,062,350 A | 5/2000 | Spieldiener et al. |
| 6,086,005 A | 7/2000 | Kobayashi et al. |
| 6,209,688 B1 | 4/2001 | Kuwahara |
| 6,220,403 B1 | 4/2001 | Kobayashi et al. |
| 6,279,682 B1 | 8/2001 | Feathers |
| 6,293,376 B1 | 9/2001 | Pribonic |
| 6,412,611 B1 | 7/2002 | Pribonic |
| 6,460,828 B1 | 10/2002 | Gersemsky et al. |
| 6,466,119 B1 | 10/2002 | Drew |
| 6,523,650 B1 | 2/2003 | Pribonic et al. |
| 6,533,083 B1 | 3/2003 | Pribonic et al. |
| 6,557,673 B1 | 5/2003 | Desta et al. |
| 6,561,451 B1 | 5/2003 | Steinich |
| 6,659,237 B1 | 12/2003 | Pribonic |
| 6,756,870 B2 | 6/2004 | Kuwahara |
| 6,793,203 B2 | 9/2004 | Heinrichs et al. |
| 6,810,997 B2 | 11/2004 | Schreiber et al. |
| 6,918,469 B1 | 7/2005 | Pribonic et al. |
| 6,962,235 B2 | 11/2005 | Leon |
| 6,973,999 B2 | 12/2005 | Ikuta et al. |
| 7,011,607 B2 | 3/2006 | Kolda et al. |
| 7,014,026 B2 | 3/2006 | Drussel et al. |
| 7,018,324 B1 | 3/2006 | Lin |
| 7,279,055 B2 | 10/2007 | Schuler |
| 7,281,612 B2 | 10/2007 | Hsieh |
| 7,281,620 B2 | 10/2007 | Wolner et al. |
| 7,513,334 B2 | 4/2009 | Calver |
| 7,528,514 B2 | 5/2009 | Cruz et al. |
| 7,984,796 B2 | 7/2011 | Pribonic |
| 8,037,978 B1 | 10/2011 | Boren |
| 8,272,476 B2 | 9/2012 | Hartman et al. |
| 8,424,460 B2 | 4/2013 | Lerner et al. |
| 8,490,751 B2 | 7/2013 | Allington et al. |
| 8,511,434 B2 | 8/2013 | Blomberg |
| 8,556,234 B2 | 10/2013 | Hartman et al. |
| 8,567,561 B2 | 10/2013 | Strasser et al. |
| 8,601,951 B2 | 12/2013 | Lerner |
| 8,851,235 B2 | 10/2014 | Allington et al. |
| 9,016,435 B2 | 4/2015 | Allington et al. |
| 9,199,103 B2 | 12/2015 | Hetrich et al. |
| 9,242,128 B2 | 1/2016 | Macy |
| 2002/0162477 A1 | 11/2002 | Palumbo |
| 2002/0179372 A1 | 12/2002 | Schreiber et al. |
| 2003/0116391 A1 | 6/2003 | Desta et al. |
| 2003/0168911 A1 | 9/2003 | Anwar |
| 2003/0211914 A1 * | 11/2003 | Perkins .................. F16H 48/30 |
| | | 475/231 |
| 2004/0055836 A1 | 3/2004 | Pribonic et al. |
| 2004/0073346 A1 | 4/2004 | Roelleke |
| 2004/0168855 A1 | 9/2004 | Leon |
| 2004/0191401 A1 | 9/2004 | Bytnar et al. |
| 2005/0051659 A1 | 3/2005 | Wolner et al. |
| 2005/0082410 A1 | 4/2005 | Tanaka et al. |
| 2005/0117258 A1 | 6/2005 | Ohta et al. |
| 2005/0189830 A1 | 9/2005 | Corbin, III et al. |
| 2005/0263356 A1 | 12/2005 | Marzano et al. |
| 2006/0219498 A1 | 10/2006 | Organek et al. |
| 2006/0278478 A1 | 12/2006 | Pribonic et al. |
| 2007/0000741 A1 | 1/2007 | Pribonic et al. |
| 2007/0001048 A1 | 1/2007 | Wooster et al. |
| 2007/0135561 A1 | 6/2007 | Rath et al. |
| 2007/0228202 A1 | 10/2007 | Scharf et al. |
| 2007/0228713 A1 | 10/2007 | Takemura |
| 2007/0256906 A1 | 11/2007 | Jin et al. |
| 2008/0059028 A1 | 3/2008 | Willerton |
| 2008/0074223 A1 | 3/2008 | Pribonic |
| 2008/0087510 A1 | 4/2008 | Pribonic |
| 2008/0105503 A1 | 5/2008 | Pribonic |
| 2008/0106420 A1 | 5/2008 | Rohlf |
| 2008/0135579 A1 | 6/2008 | Bertram et al. |
| 2009/0026303 A1 | 1/2009 | Schmitz et al. |
| 2009/0032785 A1 | 2/2009 | Jones |
| 2009/0084883 A1 | 4/2009 | Casebolt et al. |
| 2009/0114892 A1 | 5/2009 | Lesko |
| 2009/0166459 A1 | 7/2009 | Niitsuma et al. |
| 2009/0178887 A1 | 7/2009 | Reeves et al. |
| 2009/0211846 A1 | 8/2009 | Taylor |
| 2009/0319212 A1 | 12/2009 | Cech et al. |
| 2010/0032255 A1 | 2/2010 | Conti et al. |
| 2010/0065373 A1 | 3/2010 | Stone et al. |
| 2010/0112224 A1 | 5/2010 | Lott |
| 2010/0116922 A1 | 5/2010 | Choate et al. |
| 2010/0211239 A1 | 8/2010 | Christensen et al. |
| 2011/0084158 A1 | 4/2011 | Meillet et al. |
| 2011/0114907 A1 | 5/2011 | Hartman et al. |
| 2011/0147125 A1 | 6/2011 | Blomberg |
| 2011/0166744 A1 | 7/2011 | Lu et al. |

(56) References Cited

U.S. PATENT DOCUMENTS

| | | | |
|---|---|---|---|
| 2011/0174914 A1 | 7/2011 | Yang | |
| 2011/0175473 A1 | 7/2011 | Kitabatake et al. | |
| 2011/0240403 A1 | 10/2011 | Meillet | |
| 2011/0297778 A1 | 12/2011 | Meillet et al. | |
| 2012/0055740 A1 | 3/2012 | Allington et al. | |
| 2012/0118670 A1 | 5/2012 | Olson et al. | |
| 2012/0312540 A1 | 12/2012 | Lefebvre | |
| 2013/0048422 A1 | 2/2013 | Hartman et al. | |
| 2013/0087433 A1 | 4/2013 | Sejourne | |
| 2013/0118842 A1 | 5/2013 | Lerner | |
| 2013/0186721 A1 | 7/2013 | Bogdanowicz et al. | |
| 2014/0048639 A1 | 2/2014 | Allington et al. | |
| 2014/0110947 A1 | 4/2014 | Mongeau | |
| 2014/0224597 A1 | 8/2014 | Takezawa et al. | |
| 2014/0346909 A1* | 11/2014 | Vogler | G03F 7/70766 310/105 |
| 2014/0375158 A1 | 12/2014 | Allington et al. | |
| 2015/0196820 A1* | 7/2015 | Allington | H02K 49/046 182/239 |
| 2015/0266454 A1 | 9/2015 | McGowan | |
| 2015/0352380 A1 | 12/2015 | Huang et al. | |
| 2016/0052401 A1* | 2/2016 | McGowan | B60L 7/28 188/164 |
| 2016/0317936 A1 | 11/2016 | Diehl et al. | |
| 2016/0360738 A1 | 12/2016 | Richardson | |
| 2017/0237313 A1 | 8/2017 | Diehl et al. | |
| 2017/0244313 A1 | 8/2017 | Diehl et al. | |
| 2017/0274261 A1 | 9/2017 | Allington et al. | |
| 2017/0328424 A1 | 11/2017 | Allington et al. | |
| 2017/0338728 A1 | 11/2017 | Diehl et al. | |
| 2018/0264296 A1 | 9/2018 | Diehl et al. | |
| 2018/0269767 A1 | 9/2018 | Diehl et al. | |
| 2018/0269769 A1 | 9/2018 | Allington et al. | |
| 2018/0370484 A1 | 12/2018 | Diehl et al. | |

FOREIGN PATENT DOCUMENTS

| | | |
|---|---|---|
| CN | 202203305 U | 4/2012 |
| CN | 102497085 A | 6/2012 |
| CN | 102627063 A | 8/2012 |
| CN | 103244577 A | 8/2013 |
| CN | 103326538 A | 9/2013 |
| DE | 93 00 966 U1 | 3/1993 |
| DE | 10 2005 032 694 A1 | 1/2007 |
| EP | 0 247 818 A2 | 12/1987 |
| EP | 0 460 494 A1 | 12/1991 |
| EP | 0 909 684 A2 | 4/1999 |
| EP | 1 094 240 A2 | 4/2001 |
| EP | 1 401 087 A1 | 3/2004 |
| EP | 1 432 101 A1 | 6/2004 |
| EP | 1 480 320 A1 | 11/2004 |
| EP | 1 564 868 A1 | 8/2005 |
| EP | 1 244 565 B1 | 7/2006 |
| GB | 721748 A | 1/1955 |
| GB | 908128 A | 10/1962 |
| GB | 2 340 461 A | 2/2000 |
| GB | 2 352 644 A | 2/2001 |
| GB | 2 352 645 A | 2/2001 |
| GB | 2 352 784 A | 2/2001 |
| GB | 2 357 563 A | 6/2001 |
| JP | 49-097163 A | 9/1974 |
| JP | S53-113528 U | 9/1978 |
| JP | 56-107092 | 8/1981 |
| JP | 58-25152 U | 2/1983 |
| JP | 60-259278 A | 12/1985 |
| JP | 63-64542 A | 3/1988 |
| JP | 5-296287 A | 11/1993 |
| JP | H05-84347 U | 11/1993 |
| JP | 8-252025 A | 10/1996 |
| JP | 10-98868 A | 4/1998 |
| JP | 10-140536 A | 5/1998 |
| JP | H10-178717 A | 6/1998 |
| JP | 10-304799 A | 11/1998 |
| JP | 11-119680 A | 4/1999 |
| JP | 11-189701 A | 7/1999 |
| JP | 11-315662 A | 11/1999 |
| JP | 2000-189530 A | 7/2000 |
| JP | 2000-316272 A | 11/2000 |
| JP | 2001-17041 A | 1/2001 |
| JP | 2005-353123 A | 12/2005 |
| JP | 2012-152316 A | 8/2012 |
| RU | 106 462 U1 | 7/2011 |
| WO | 95/16496 A1 | 6/1995 |
| WO | 96/17149 A1 | 6/1996 |
| WO | 98/47215 A1 | 10/1998 |
| WO | 01/38123 A1 | 5/2001 |
| WO | 03/055560 A1 | 7/2003 |
| WO | 2007/060053 A1 | 5/2007 |
| WO | 2008/139127 A1 | 11/2008 |
| WO | 2009/013479 A1 | 1/2009 |
| WO | 2009/047469 A1 | 4/2009 |
| WO | 2009/108040 A1 | 9/2009 |
| WO | 2009/127142 A1 | 10/2009 |
| WO | 2010/104405 A2 | 9/2010 |

OTHER PUBLICATIONS

Extended European Search Report, dated Mar. 29, 2018, for European Application No. 15834380.6-1201, 12 pages.

Extended European Search Report, dated Apr. 6, 2018, for European Application No. 15864540.8-1201, 26 pages.

Final Office Action, dated Feb. 28, 2017, for U.S. Appl. No. 14/464,255, Allington et al., "Braking Mechanisms," 10 pages.

Notice of Allowance, dated Jul. 21, 2014, for U.S. Appl. No. 13/255,625, Allington et al., "Braking Mechanisms," 11 pages.

Office Action, dated Aug. 22, 2017, for U.S. Appl. No. 14/464,255, Allington et al., "Braking Mechanisms," 5 pages.

Office Action, dated Feb. 20, 2018, for U.S. Appl. No. 14/464,255, Allington et al., "Braking Mechanisms," 15 pages.

Office Action, dated Jan. 17, 2018, for U.S. Appl. No. 15/586,111, Allington et al., "Braking Mechanisms," 15 pages.

Office Action, dated Jan. 9, 2014, for U.S. Appl. No. 13/255,625, Allington et al., "Braking Mechanisms," 9 pages.

Office Action, dated Jul. 25, 2016, for U.S. Appl. No. 14/464,255, Allington et al., "Braking Mechanisms," 10 pages.

Park et al., "Torque analysis and measurements of a permanent magnet type Eddy current brake with a Halbach magnet array based on analytical magnetic field calculations," *Journal of Applied Physics* 115(17):17E707, 2014. (3 pages).

International Search Report and Written Opinion, dated Apr. 1, 2016, for International Application No. PCT/NZ2015/050206, 9 pages.

International Search Report and Written Opinion, dated Feb. 13, 2009, for International Application No. PCT/US2008/087863, 15 pages.

International Search Report and Written Opinion, dated Feb. 23, 2011, for International Application No. PCT/NZ2010/000011, 10 pages.

International Search Report and Written Opinion, dated Feb. 24, 2016, for International Application No. PCT/NZ2015/050207, 10 pages.

International Search Report and Written Opinion, dated Jan. 29, 2016, for International Application No. PCT/NZ2015/050208, 11 pages.

International Search Report and Written Opinion, dated Mar. 11, 2015, for International Application No. PCT/NZ2014/000245, 8 pages.

International Search Report and Written Opinion, dated Mar. 18, 2016, for International Application No. PCT/NZ2015/050209, 14 pages.

International Search Report and Written Opinion, dated Mar. 29, 2016, for International Application No. PCT/NZ2015/050205, 10 pages.

International Search Report and Written Opinion, dated Nov. 11, 2015, for International Application No. PCT/NZ2015/050114, 10 pages.

(56) References Cited

OTHER PUBLICATIONS

International Search Report and Written Opinion, dated Nov. 18, 2015, for International Application No. PCT/NZ2015/050113, 9 pages.
International Search Report and Written Opinion, dated Oct. 26, 2015, for International Application No. PCT/NZ2015/050115, 10 pages.
MSA Safety Incorporated, Auto Belay Stop Use Notice, Oct. 15, 2009, URL=http://verticalendeavors.com/minneapolis/auto-belay-stop-us-notice/, download date Apr. 6, 2017, 2 pages.
North Safety Products Europe B.V., "Climbing Wall Descender: FP2/5**GDD," *Climbing Wall Descent Controllers Instruction Manual v3*, Aug. 18, 2008, 20 pages.
TRUBLUE Auto Belays, Model TB150-12C Operator Manual, Jun. 20, 2013, 37 pages.

\* cited by examiner

TRANSMISSIONS INCORPORATING EDDY CURRENT BRAKING

BACKGROUND

Technical Field

Described herein is a transmission mechanism and method of use incorporating eddy current drag elements and in doing so controlling or tailoring movement between members.

Description of the Related Art

The applicant's co-pending and granted patents in the field of eddy current related devices include U.S. Pat. Nos. 8,851,235, 8,490,751, NZ619034, NZ627617, NZ627619, NZ627633, NZ627630 and other equivalents all incorporated herein by reference. The devices described in these patents/applications may be useful, for example due to their providing frictionless methods of controlling movement. However, other methods of altering eddy current interactions and transmitting eddy current interactions may also be achieved or at least provide the public with a choice.

Further aspects and advantages of the transmission mechanisms and methods of use should become apparent from the ensuing description that is given by way of example only.

BRIEF SUMMARY

Described herein is a transmission mechanism and method of use for braking relative movement between members, movement and braking of the members being directed through one or more transmission elements. The transmission mechanism and method of use allows for enhanced braking/retarding performance thereby providing a greater performance to that observed where the eddy current elements are directly coupled to an external motive source.

In a first aspect, there is provided a transmission mechanism comprising:
  at least one driving member (motive source); and
  at least one driven member, movement of the at least one driven member urged via transmission of movement from the at least one driving member;
  drag force inducing elements that move at different relative rates comprising at least one electrical conductor and at least one magnet, each element coupled with the transmission mechanism in a manner that allows the elements to interact on movement and generate eddy current drag forces, the elements thereby acting to govern the rate of movement between the driving and driven members.

In a second aspect, there is provided a method of transferring an eddy current drag force between members by the step of:
  (a) selecting a transmission mechanism substantially as described herein;
  (b) applying a motive force on the at least one driving member that in turn applies a motive force on the at least one driven member;
  (c) by causing motion of the at least one driven member, inducing an eddy current drag force on either the at least one driving member or at least one driven member thereby retarding movement of the member or members directly or indirectly via the transmission.

Advantages of the above described transmission mechanism and method of use includes the ability to direct and transfer an eddy current drag force directly or indirectly. Transmission of the eddy current induced force also allows the ability to multiply the brake effects thereby increasing the efficiency of the mechanism compared to a directly coupled eddy current brake mechanism.

BRIEF DESCRIPTION OF THE SEVERAL VIEWS OF THE DRAWINGS

Further aspects of the transmission mechanisms and methods of use will become apparent from the following description that is given by way of example only and with reference to the accompanying drawings in which.

DETAILED DESCRIPTION

Figure 1:
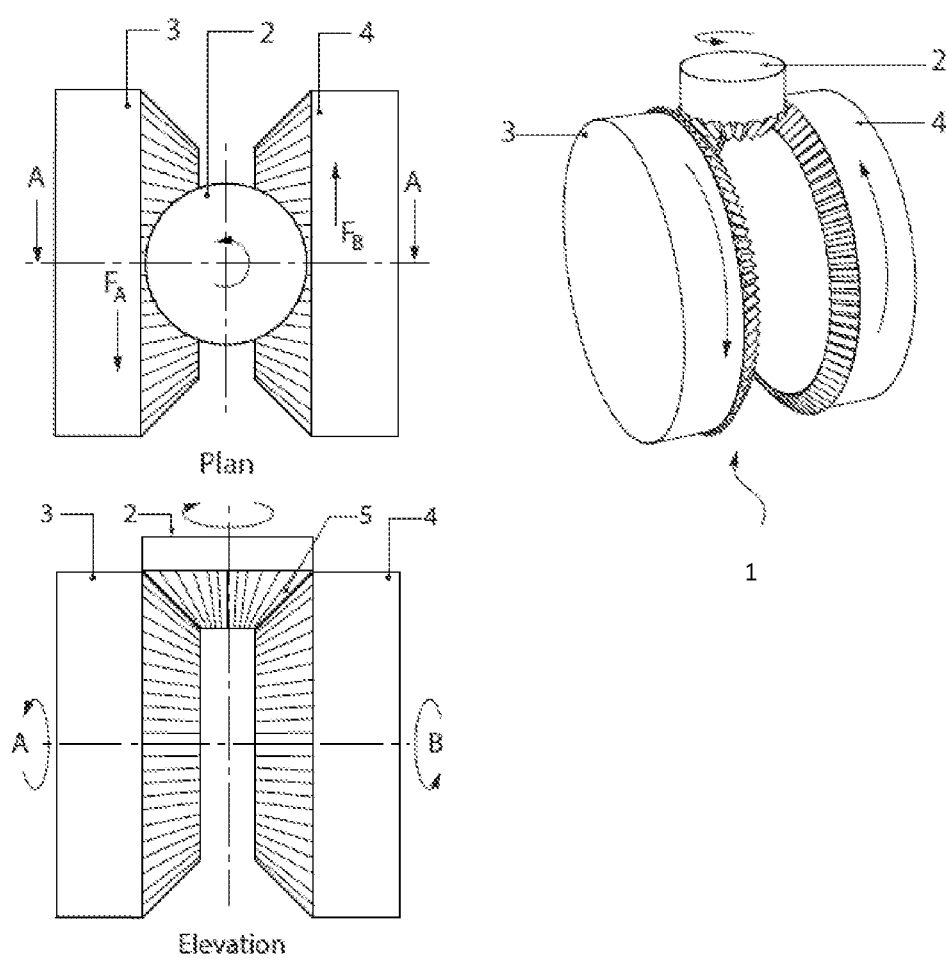
FIG. 1 illustrates an example of a bevel gear transmission.

As noted above, described herein are transmission mechanisms and methods of use for braking relative movement between members, movement and braking of the members being directed through one or more transmission elements. The transmission mechanism and method of use allows for enhanced braking/retarding performance thereby providing a greater performance to that observed where the eddy current elements are directly coupled to an external motive source.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

In a first aspect, there is provided a transmission mechanism comprising:
  at least one driving member (motive source); and
  at least one driven member, movement of the at least one driven member urged via transmission of movement from the at least one driving member;
  eddy current drag force inducing elements that move at different relative rates comprising at least one electrical conductor and at least one magnet, each element coupled with the transmission mechanism in a manner that allows the elements to interact on movement and generate eddy current drag forces, the elements thereby acting to govern the rate of movement between the driving and driven members.

The transmission may translate movement of the driving member to movement of the at least one second driven member. For example, transmitting rotation of the driving member shaft to rotation of the driven member shaft. Transmission may be via a gear box coupling, a cog or cogs. Transmission may be via a coupling that does not utilize fasteners so that the driving and/or driven member(s) may be releasably linked together.

As noted above, eddy current drag force inducing elements may be incorporated into the mechanism. Eddy current drag is induced when an electrically conductive element moves in a magnetic field (or vice versa), the eddy current drag forces induced then slow relative movement between the conductive element and the magnetic field.

The at least one conductor may be directly coupled to the at least one driving member (motive source) and the at least one magnet is indirectly coupled to the at least one driving member (motive source) via the transmission mechanism, and wherein:

(a) the transmission mechanism moves both elements rotationally;

(b) the reaction torque (eddy current drag force effects) induced by the elements is transferred into the driving member of the transmission mechanism. Alternatively, the at least one magnet may be directly coupled to the at least one driving member (motive source) and the at least one conductor is indirectly coupled to the at least one driving member (motive source) via the transmission mechanism, and wherein:

(a) the transmission mechanism moves both elements rotationally;

(b) the reaction torque (eddy current drag force effects) induced by the elements is transferred into the driving member of the transmission mechanism.

The at least one electrical conductor and the at least one magnet may be independent to each other and indirectly coupled to the at least one driving member by the transmission mechanism. One type of transmission mechanism employing this arrangement may be a bevel drive. As may also be appreciated, this arrangement also allows the possibility of having varying transmission ratios for both the at least one conductor and at least one magnet.

The at least one driving member may be a shaft or coupling that rotates. A rotational driving torque may be imposed by a force. For example, the force may be generated by an object linked to the driving member, non-limiting examples including a wheel or an object linked to a spool via a line, the spool rotating when the object causes the line to pay out from the spool as may be the case for autobelay or fall safety apparatus. These devices are described in more detail below.

The at least one second driven member may be a shaft or coupling that also rotates.

In the above embodiment, rotational movement of the at least one driving member urges at least two driven members to rotate in opposite directions. In one embodiment, the driving member and at least one driven member in a rotational embodiment may be angled relative to each other, movement being transmitted via the transmission in a different (opposite) direction. The angle of translation may range from at least 1, or 5, or 10, or 15, or 20, or 25, or 30, or 35, or 40, or 45, or 50, or 55, or 60, or 65, or 70, or 75, or 80, or 85, or 90 degrees. In such embodiments, a bevel gearbox may be used to drive the change in angle. Whilst not essential, this arrangement of the driven members working together via an eddy current interaction may provide a particularly strong brake action in the embodiment described above counter rotation occurs between the driven members effectively amplifying (inducing double) the eddy current drag force owing to the opposing relative movement between the magnetic field and conductor.

Rotational movement alone as noted above should not be seen as limiting as, for example, the driven member or members may instead undergo a linear and/or axial translation as well, an example of which is described further below.

The transmission mechanism may move both members rotationally about a fixed axis. In one embodiment, the fixed axis may be a common axis between the elements although offset axes may also be used.

The ratio of movement between the driving and driven members may be pre-determined or pre-set. This may be achieved for example via a tooth and cog gear arrangement. In one embodiment, the ratio of movement between the driving and driven members may range from approximately 1:0.001 to 1:1000. The ratio of driving and driven members may be approximately 1:0.001, or 1:0.005, or 1:0.01, or 1:0.05, or 1:0.1, or 1:0.5, or 1:1 or 1:5, or 1:10, or 1:50 or 1:100, or 1:500, or 1:1000 although other ratios may be useful depending on the end application for the mechanism. In one embodiment, the ratio of movement between the driving and driven members may be approximately 1:1 although other ratios may be useful depending on the end application for the mechanism.

In one example, the transmission mechanism may be arranged so that:

(a) the at least one conductor rotates at a rotational velocity governed by the transmission ratio and the driving member (motive source) velocity; and (b) the at least one magnet rotates at a rotational velocity governed by the transmission ratio and the driving member velocity in a rotational direction opposite the direction of rotation of the conductor.

The rate of movement of the driving and driven members may vary once eddy current drag forces are induced and continue to vary until a critical velocity is reached, the critical velocity being where the eddy current drag force does not increase with increased rotational velocity acting on the at least one driving member.

On initiation of eddy current drag force generation, up to a critical velocity applied to the at least one driving member, the braking torque between the eddy current elements increases by twice the transmission ratio.

On initiation of eddy current drag force generation, up to a critical velocity applied to the at least one driving member, the braking torque between the eddy current elements may act on both the at least one driven and at least one driving members via the transmission.

Alternatively, on initiation of eddy current drag force generation, up to a critical velocity applied to the at least one driving member, the braking torque between the eddy current elements may act on the at least one driving member via the transmission and at least one driven member. In this embodiment, the eddy current elements may not be directly coupled to the at least one driving member. This embodiment may be used where further multiplication in torque achieved over an eddy current brake effect may be desired with the at least one driving member coupled to only one eddy current element (at least one conductor or at least one magnet).

Above the critical velocity, the reaction torque may remain multiplied relative to a directly coupled system and the reaction torque remains approximately constant with variation in speed above the critical velocity.

As may be appreciated from the above, the mechanism described allows considerably increased drag force effects than a directly coupled eddy current drag mechanism. In other words, up to the critical velocity and torque of the eddy current drag force effects, the mechanism described herein may:

- Approximately double the braking torque in rotational speeds up to the critical velocity of the eddy current drag force action on the on the transmission members;
- Causes the approximately doubled torque on the eddy current elements to act on the driving member (motive source) in two locations, thereby doubling the torque further;
- It can be seen that this provides approximately four times the reaction torque to the motive force over that of the same eddy current elements directly coupled to the driving member (motive force). Further, the critical velocity apparent at the motive input is half of that of a directly coupled system.

As noted above, the critical velocity is a point where the eddy current drag force does not increase with increased rotational velocity and the reaction torque remains multiplied over a directly coupled system and approximately constant and/or controlled. That is, above the critical velocity, an extra force input into the driving member leads to the same eddy current drag force output.

The transmission mechanism may be a worm drive. The term 'worm drive' refers to a gear arrangement where a worm (gear in the form of a screw) meshes with a mating gear. Other types of drive with a similar mechanism are also encompassed with this term including helical gears with angularly offset axes and/or helical spur gears with axes of rotation angularly rotated to each other. In this embodiment, the transmission may operate in the mode of providing a step up in velocity from the rotational velocity of the driving member to the rotational velocity of the eddy current inducing element or elements thereby providing a resisting force to the rotational velocity of the driving member.

The transmission ratio and/or coefficient of friction at the gear interface may be selected such that the transmission operates with a prescribed level of mechanical efficiency. The prescribed level of mechanical efficiency may be sufficiently low to provide a supplementary retarding torque over that provided by the induced eddy current drag force and the numerical gear ratio alone. In practice it is envisaged that the mechanism may have a low mechanical efficiency—that is, there would be significant mechanical losses in the transmission. The prescribed level of mechanical efficiency (if low) results in an increase on the reaction torque on the motive force in excess of that conferred by the eddy current drag force and the numerical gear ratio alone. A benefit of this is that the mechanical losses in the worm system can be used as a supplementary retarding torque, proportional to the eddy current drag force, as governed by the laws of friction, thereby decreasing the torque demand required of the eddy current drag force over an eddy current brake system coupled with a very high efficiency transmission system.

In the above worm drive embodiment, a friction torque may be held approximately in proportion to the eddy current element induced braking torque. As may be appreciated, this arrangement may act to amplify the eddy current induced braking torque.

The transmission mechanism may be configured to comprise a worm drive using an axially fixed eddy current element retaining worm. As may be appreciated this is a very simple arrangement yet this achieves the desired objective of transmitted driving and driven elements with eddy current induced braking effects on movement.

The transmission mechanism may be configured to comprise:
  a tube including a wall and void defined therein;
  a cylinder that fits into the tube void, the cylinder being a driven member linked to a driving member providing an input torque, the cylinder moving in response to an input torque on the driving member relative to the tube via axial translation of the cylinder relative to the tube so that the cylinder can pass at least partially into or out of the tube void; and rotation of the cylinder relative to the tube about a longitudinal axis, the axis passing through the tube void;
  wherein, coupled to the tube and cylinder are one or more eddy current inducing elements and, in use, the cylinder and tube have different relative speeds of rotation to each other such that, when the tube and/or cylinder is or are moved via axial translation caused by the driven member so that the cylinder at least partially enters the tube void, a braking reaction force on rotation of the driven member occurs due to induced eddy current drag force generation thereby slowing the velocity of rotation of the driving member.

In the above configuration, the degree of overlap between the tube and cylinder may determine the degree of eddy current induced drag force.

The axial force applied to the cylinder may be imposed by the driven member, the degree of axial force applied being proportional to the torque acting on the driving member. Imposing may be via a reaction force acting on the driven member causing driven member movement e.g. extension of the worm along the line of a shaft that is the driven member causing driven member rotation. This example should not be seen as limiting as it should be appreciate that the imposed axial force may be applied in many different ways to suit the end application.

The transmission used in the above tube and cylinder embodiment may be a worm drive, the term 'worm drive' defined in a similar manner to that noted above except in this case the worm drive is incorporated into the tube and cylinder arrangement.

The eddy current elements may be selectively coupled to the driven member (or worm element if used), whereby the axial force applied to the driven member may be used to engage and disengage a coupling connecting the driven member to the eddy current elements. Engagement occurs in response to a force threshold having been achieved. Disengagement occurs in response to a force threshold having been achieved. An engaging effect may be useful to allow movement under a range of 'normal' scenarios for a device in which the mechanism is used, but, on application of a predetermined force, engagement and braking then occurs (and disengagement as well once the predetermined force is reached post engagement). Movement of the eddy current elements (magnets and conductor(s)) together or apart to engage or disengage may be urged via a mechanism such as a bias mechanism.

In a second aspect, there is provided a method of transferring an eddy current drag force between members by the step of:
  (a) selecting a transmission mechanism substantially as described herein;
  (b) applying a motive force on the at least one driving member that in turn applies a motive force on the at least one driven member;
  (c) by causing motion of the at least one driven member, inducing an eddy current drag force on either the at least one driving member or at least one driven member thereby retarding movement of the member or members directly or indirectly via the transmission.

Final embodiments for the transmission mechanism described herein may be varied. For example, an autobelay or self-retracting lifeline (SRL) embodiment may use the transmission mechanism and method of use described. In an SRL embodiment, a line may extend and retract from the SRL device and when the line extends from the SRL device at a rate beyond a predefined threshold, the transmission mechanism engages and applies a retarding force on the rate of line extension. SRL and autobelay applications should not be seen as limiting since the transmission mechanisms described may be used for a wide variety of other applications, non-limiting examples including speed control or load control of:

A rotor in a rotary turbine;
Exercise equipment e.g. rowing machines, epicyclic trainers, weight training equipment;
Roller-coasters and other amusement rides;
Elevator and escalator systems;
Evacuation descenders and fire escape devices;
Conveyer systems:
Rotary drives in factory production facilities;
Materials handling devices such as conveyer belts or a braking device in a chute;
Roadside safety systems e.g. the energy absorber may be connected in a system to provide crash attenuation though the dissipation of energy via the energy absorber;
Seat belts in vehicles;
Zip lines;
Braking mechanisms for trolleys and carriages;
Bumpstops in transport applications;
Bumpstops in crane applications;
Torque or force limiting devices in mechanical drive train;
Structural overload protection in wind turbines;
Load limiting and energy dissipation in structures, buildings and bridges.

Advantages of the above described transmission mechanism and method of use includes the ability to direct and transfer an eddy current drag force directly or indirectly. Transmission of the eddy current induced force also allows the ability to multiply the brake effects thereby increasing the efficiency of the mechanism compared to a directly coupled eddy current brake mechanism.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as of individually set forth.

WORKING EXAMPLES

The above described transmission mechanism and method of use is now described by reference to specific examples.

Example 1

FIG. 1 illustrates a bevel gear transmission 1. The driving member 2 drives movement of the driven members 3,4 via a cog arrangement 5. Rotation movement of the driving member 2 drives counter rotating movement shown by the arrows A and B of the driven members 3,4. Gearing may be used on the cogs to increase or decrease relative counter rotation of the driven members.

Figure 2:
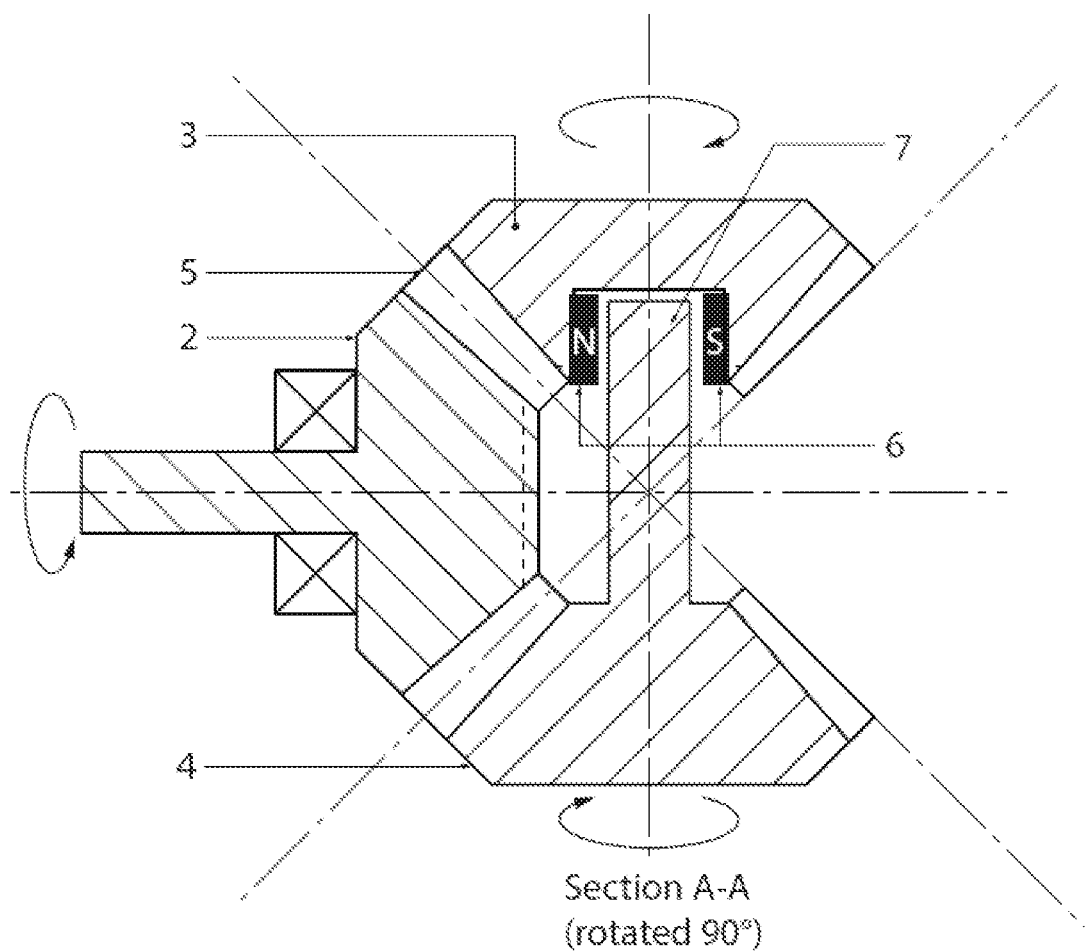
FIG. 2 illustrates an example of a bevel gear transmission mechanism incorporating an eddy current drag element.

FIG. 2 illustrates how an eddy current drag inducing element may be integrated into the bevel gear transmission 1 shown in FIG. 1. FIG. 2 shows a driving member 2 that rotates to impart rotation movement on the driven members 3,4. Movement is transmitted via the transmission about a 90 degree bend 5. By virtue of this force transmission the driven members 3,4 oppose each other and they counter rotate relative to each other. An eddy current drag element may be integrated into the transmission mechanism by use of magnets 6 located about the axis of a first driven member 3 and a shaft 7 extending from the axis of the second driven member 4 that acts as a conductor 7 which interacts with the magnetic field created by the magnets 6 on the first driven member 3. Since the driven members 3,4 are positioned opposite each other a common axis of rotation can integrate the eddy current drag element. As noted above, the bevel gear transmission 5 imparts counter rotational movement of the driven members 3,4. This has the advantage of effectively doubling the eddy current induced forces since the relative motion between the driven members 3,4 is potentially equal and opposite rotation. It should be appreciated that the magnets 6 and conductor 7 may be reversed with the magnets 6 being located on the second driven member shaft 4 and the conductor 7 being located about the first driven member 3.

Example 2

Figure 3:
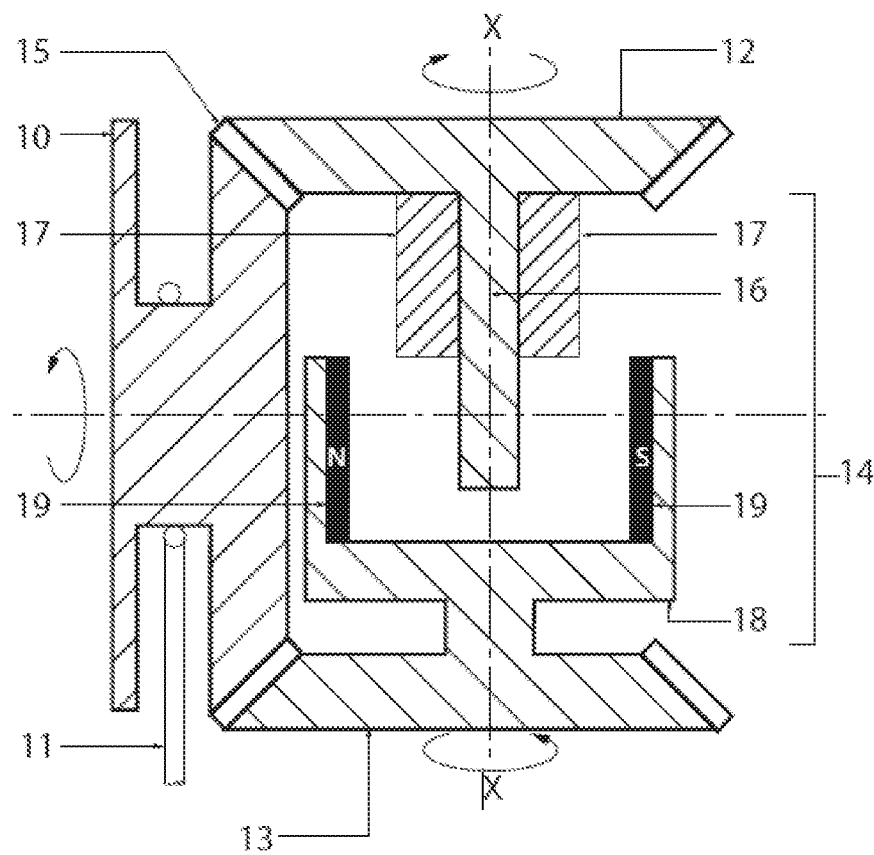
FIG. 3 illustrates images of a spool and gear transmission embodiment.

FIG. 3 illustrates a potential product embodiment where the driving member is coupled to a spool 10 of line 11, the line 11 attached to an object such as a person (not shown). In the event of line 11 being drawn from the spool 10, spool 10 rotation occurs that in turn causes rotation of the driven members 12,13. The driven members 12,13 incorporate an eddy current drag element 14 and when rotation occurs, a drag force is imparted on the spool 10 via the transmission mechanism 15. In FIG. 3, the eddy current drag element comprises an axial shaft 16 extending from the first driven member 12 and a conductive member 17 on the shaft 16 that may move rotationally with the shaft 16 and axially based on an urging force (not shown). The second driven member 13 includes a hollow cylindrical extension 18 located with a common axis of rotation X with the second driven member 13 (and first driven member 12). The inside of the hollow cylinder 18 may be lined with magnets 19 to create a magnetic field inside the hollow cylinder 18. Driving member 10 movement causes counter rotational driven members 12,13 movement via the transmission 15. Axial movement of the conductive member 17 on the first driven member 12 may occur moving the conductive member 17 into the hollow cylinder 18 thereby inducing eddy current drag interactions. This in turn brakes relative movement between the driven members 12,13 which, via the transmission 15, brakes movement of the driving member 10.

Example 3

Figure 4A:
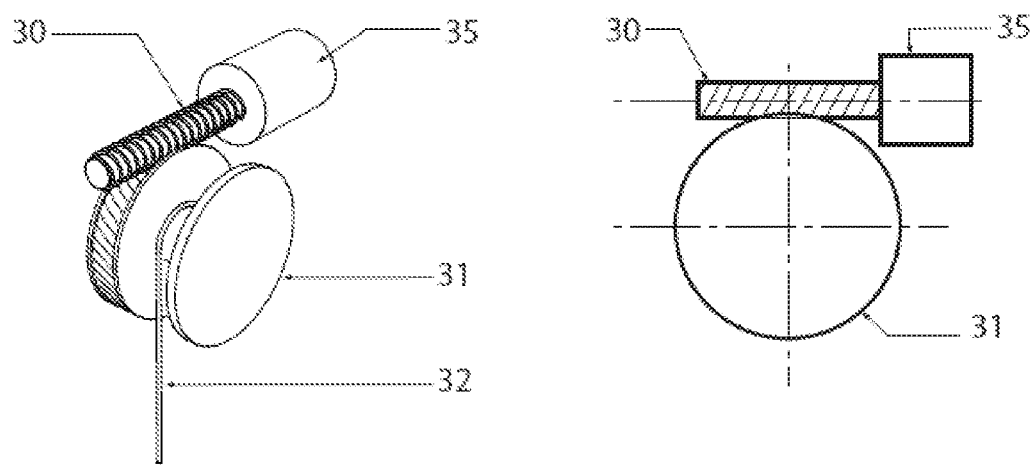
FIG. 4a illustrates perspective and elevation views of a worm drive and spool embodiment.

FIG. 4*a* illustrates an alternative embodiment using a worm drive 30 as a driven member and a spool 31 with line 32 acting as the driving member. The worm drive 30 acts as a transmission mechanism transmitting rotational movement of the spool 31 into rotational and axial movement of the worm drive 30. The worm drive 30 may include an eddy current drag element 35.

Figure 4B:
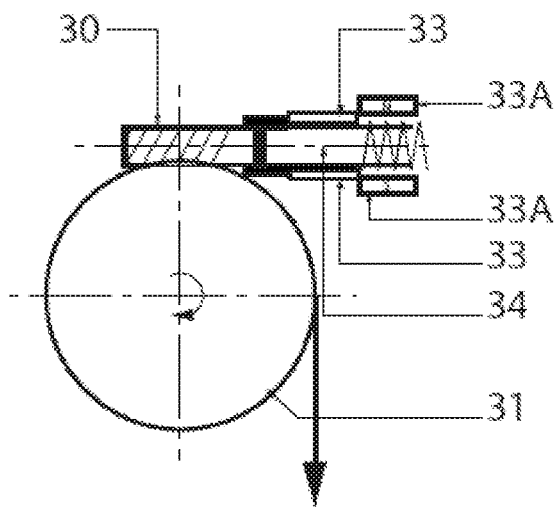
FIG. 4b illustrates an elevation view of an image of a plunger arrangement also using a worm drive with the plunger elements engaged.
Figure 4C:
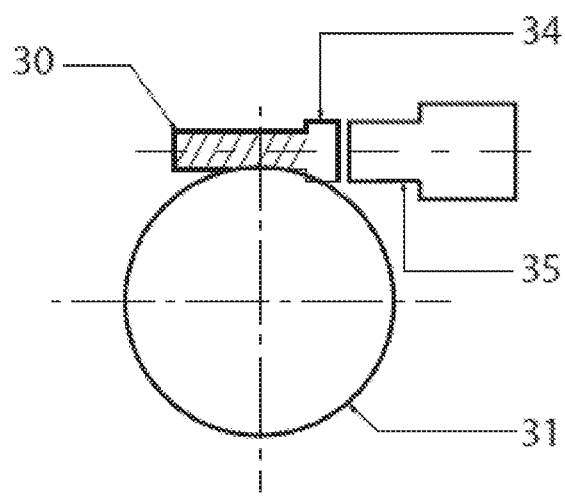
FIG. 4c illustrates an elevation view of an image of a plunger arrangement also using a worm drive with the plunger elements dis-engaged.

In FIG. 4*b*, the eddy current drag element comprises a hollow cylinder 33 with a magnetic field generated by magnets 33A and a conductive member (a plunger) 34 that moves rotationally and, optionally axially, into and out of the magnetic field. When the plunger 34 is in the magnetic field, eddy current drag forces are induced thereby slowing rotation and/or axial translation of the worm drive 30. This in turn slows movement of the spool 31 or driving member. The plunger 34 may move axially in response to the axial thrust provided by the worm drive 30. FIG. 4*c* illustrates how the plunger 34 and cylinder 33 may separate via axial translation along a common axis of rotation. Once separated, the parts may not incur and eddy current braking effects but can engage once a predetermined force threshold is reached Aspects of the transmission mechanism and method of use have been described by way of example only and it should be appreciated that modifications and additions may be made thereto without departing from the scope of the claims herein.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A transmission mechanism comprising:
   at least one driving member;
   at least one driven member, movement of the at least one driven member urged by transmission of movement from the at least one driving member; and
   drag force inducing elements that move at different relative rates, comprising at least one electrical conductor and at least one magnet, each of the drag force inducing elements coupled with the at least one driven member in a manner that allows the drag force inducing elements to interact and generate eddy current drag forces upon movement of the drag force inducing elements;
   wherein when a first motive force is applied to the at least one driving member, a second motive force is transmitted to the at least one driven member, an eddy current drag force is induced on the at least one driven member by interaction between the at least one electrical conductor and the at least one magnet that are coupled to the at least one driven member, and the eddy current drag force retards movement of the at least one driving member;
   wherein a transmission ratio between the at least one driving member and the at least one driven member is pre-determined and between 1:0.001 and 1:1000;
   wherein the at least one electrical conductor rotates at a first rotational velocity governed by the transmission ratio and a velocity of the driving member; and
   wherein the at least one magnet rotates at a second rotational velocity governed by the transmission ratio and the velocity of the driving member in a rotational direction opposite the direction of rotation of the at least one electrical conductor.

2. The transmission mechanism as claimed in claim 1 wherein:
   the at least one electrical conductor is directly coupled to the at least one driving member;
   the at least one magnet is indirectly coupled to the at least one driving member by the transmission mechanism;
   the transmission mechanism moves both the at least one electrical conductor and the at least one magnet rotationally; and
   a reaction torque induced by the at least one electrical conductor and the at least one magnet is transferred into the driving member.

3. The transmission mechanism as claimed in claim 1 wherein:
   the at least one magnet is directly coupled to the at least one driving member;
   the at least one electrical conductor is indirectly coupled to the at least one driving member by the transmission mechanism;
   the transmission mechanism moves both the at least one electrical conductor and the at least one magnet rotationally; and
   a reaction torque induced by the at least one electrical conductor and the at least one magnet is transferred into the driving member.

4. The transmission mechanism as claimed in claim 1 wherein the at least one electrical conductor and the at least one magnet are independent to each other and coupled to the at least one driven member.

5. The transmission mechanism as claimed in claim 1 wherein rotational movement of the at least one driving member urges at least two driven members to rotate in opposite directions.

6. The transmission mechanism as claimed in claim 1 wherein the transmission mechanism moves the at least one driving member rotationally about a fixed axis and the at least one driven member rotationally about the fixed axis.

7. The transmission mechanism as claimed in claim 6 wherein the fixed axis is a common axis between the at least one electrical conductor and the at least one magnet.

8. The transmission mechanism as claimed in claim 1 wherein rates of movement of the driving and driven members vary when eddy current drag forces are induced, and continue to vary until a critical velocity is reached, the critical velocity being a velocity at which the eddy current drag forces do not increase with increased rotational velocity of the at least one driving member.

9. The transmission mechanism as claimed in claim 1 wherein, on initiation of eddy current drag force generation, up to a critical velocity of the driving member, a braking torque between the drag force inducing elements increases by approximately twice the transmission ratio.

10. The transmission mechanism as claimed in claim 9 wherein above the critical velocity, the braking torque remains approximately constant with variation in velocity of the driving member.

11. The transmission mechanism as claimed in claim 1 wherein, on initiation of eddy current drag force generation, up to a critical velocity of the at least one driving member, a braking torque between the drag force inducing elements acts on both the at least one driven and at least one driving member.

12. The transmission mechanism as claimed in claim 1 wherein, on initiation of eddy current drag force generation, up to a critical velocity of the at least one driving member, a braking torque between the drag force inducing elements acts on the at least one driving member and on the at least one driven member.

13. The transmission mechanism as claimed in claim 1 wherein the transmission mechanism includes a worm drive.

14. The transmission mechanism as claimed in claim 13 wherein the transmission mechanism is configured to provide a step up in velocity from a rotational velocity of the at least one driving member to a rotational velocity of the drag force inducing elements, thereby providing a force to resist rotation of the at least one driving member.

15. The transmission mechanism as claimed in claim 13 wherein a transmission ratio and/or a coefficient of friction is selected such that the transmission mechanism operates with a prescribed level of mechanical efficiency.

16. The transmission mechanism as claimed in claim 15 wherein the prescribed level of mechanical efficiency is sufficiently low to provide a supplementary retarding torque over that provided by the induced eddy current drag force and a numerical gear ratio alone.

17. The transmission mechanism as claimed in claim 13 wherein a friction torque is held approximately in proportion to the eddy current drag force.

18. The transmission mechanism as claimed in claim 1, further comprising:
- a tube including a wall and a tube void defined therein;
- a cylinder that fits into the tube void, the cylinder linked to the at least one driving member, the cylinder moving in response to an input torque on the at least one driving member relative to the tube by axial translation of the cylinder relative to the tube so that the cylinder can pass at least partially into or out of the tube void, and by rotation of the cylinder relative to the tube about a longitudinal axis, the axis passing through the tube void;
- in use, the cylinder and the tube have different speeds of rotation relative to each other such that, when the tube and/or the cylinder is moved by axial translation so that the cylinder at least partially enters the tube void, a braking reaction force on rotation of the cylinder occurs due to induced eddy current drag force generation, thereby slowing the velocity of rotation of the at least one driving member.

19. The transmission mechanism as claimed in claim 18 wherein a degree of overlap between the tube and the cylinder determines a degree of eddy current induced drag force and/or magnetic attraction.

20. The transmission mechanism as claimed in claim 18 wherein the at least one driving member applies an axial force to the cylinder, the degree of axial force applied being proportional to the input torque.

21. The transmission mechanism as claimed in claim 18 wherein the transmission includes a worm drive.

22. The transmission mechanism as claimed in claim 21 wherein the drag force inducing elements are selectively coupled to the worm drive, whereby an axial force applied to the worm gear is used to engage and disengage a coupling connecting the worm drive to the drag force inducing elements.

23. The transmission mechanism as claimed in claim 22 wherein engagement occurs in response to a force threshold having been achieved.

24. The transmission mechanism as claimed in claim 23 wherein disengagement occurs in response to a force threshold having been achieved.

25. The transmission mechanism of claim 1 wherein the transmission mechanism is incorporated within an autobelay system.

26. The transmission mechanism of claim 1 wherein the transmission mechanism is incorporated within a self-retracting lifeline (SRL) system.

27. A method of transferring an eddy current drag force between members of a transmission mechanism, the transmission mechanism comprising:
- at least one driving member;
- at least one driven member, movement of the at least one driven member urged by transmission of movement from the at least one driving member; and
- drag force inducing elements that move at different relative rates, comprising at least one electrical conductor and at least one magnet, each of the drag force inducing elements coupled with the at least one driven member in a manner that allows the drag force inducing elements to interact and generate eddy current drag forces upon movement of the drag force inducing elements;
- wherein when a first motive force is applied to the at least one driving member, a second motive force is transmitted to the at least one driven member, an eddy current drag force is induced on the at least one driven member by interaction between the at least one electrical conductor and the at least one magnet that are coupled to the at least one driven member, and the eddy current drag force retards movement of the at least one driving member;
- wherein a transmission ratio between the at least one driving member and the at least one driven member is pre-determined and between 1:0.001 and 1:1000;
- wherein the at least one electrical conductor rotates at a first rotational velocity governed by the transmission ratio and a velocity of the driving member; and
- wherein the at least one magnet rotates at a second rotational velocity governed by the transmission ratio and the velocity of the driving member in a rotational direction opposite the direction of rotation of the at least one electrical conductor;
- wherein the method comprises:
- applying a motive force on the at least one driving member that in turn applies a motive force on the at least one driven member;
- causing motion of the at least one driven member, thereby inducing an eddy current drag force on either the at least one driving member or the at least one driven member, thereby retarding movement of the at least one driving member or the at least one driven member.

* * * * *